US012576982B2

(12) United States Patent
Schrell

(10) Patent No.: US 12,576,982 B2
(45) Date of Patent: Mar. 17, 2026

(54) EXHAUST NOZZLE ASSEMBLY FOR AIRCRAFT PROPULSION SYSTEM

(71) Applicant: Rohr, Inc., Chula Vista, CA (US)

(72) Inventor: Johann Schrell, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/882,328

(22) Filed: Sep. 11, 2024

(65) Prior Publication Data

US 2025/0083829 A1     Mar. 13, 2025

Related U.S. Application Data

(60) Provisional application No. 63/537,682, filed on Sep. 11, 2023.

(51) Int. Cl.
B64D 33/04 (2006.01)
F02C 7/25 (2006.01)
F02K 1/80 (2006.01)

(52) U.S. Cl.
CPC ................ B64D 33/04 (2013.01); F02C 7/25 (2013.01); F02K 1/805 (2013.01)

(58) Field of Classification Search
CPC ..... F02K 1/46; F02K 1/48; F02K 1/80; F02K 1/805; F02K 1/827; F02C 7/25; F02C 7/28; B64D 33/04
See application file for complete search history.

(56) References Cited

U.S. PATENT DOCUMENTS

| | | | |
|---|---|---|---|
| 5,143,292 A | 9/1992 | Corsmeier | |
| 5,230,540 A * | 7/1993 | Lewis ................... | F16L 23/162 |
| | | | 285/368 |
| 5,524,846 A * | 6/1996 | Shine ..................... | F02K 1/805 |
| | | | 60/796 |

(Continued)

FOREIGN PATENT DOCUMENTS

| | | |
|---|---|---|
| DE | 102006019299 B3 | 11/2007 |
| FR | 3047768 B1 | 2/2019 |
| RU | 2310766 C1 | 11/2007 |

OTHER PUBLICATIONS

EP Search Report for EP Patent Application No. 24199738.6 dated Jun. 5, 2025.

(Continued)

*Primary Examiner* — Andrew H Nguyen
(74) *Attorney, Agent, or Firm* — Getz Balich LLC

(57) ABSTRACT

An apparatus includes a chevron ring, a first seal and a plurality of fasteners. The chevron ring extends axially along an axis to and forms a downstream trailing edge of an exhaust nozzle. The chevron ring includes a ring base and a plurality of chevrons. The ring base includes a plurality of blind apertures. Each blind aperture projects radially inward towards the axis partially into the ring base. The fire seal is disposed radially outboard of the chevron ring. The fire seal axially and circumferentially overlaps the ring base. The fasteners mount the fire seal to the chevron ring. Each fastener includes a shank and a head. The shank projects longitudinally out from the head, through the fire seal, and is threaded into a respective one of the blind apertures. The fire seal is radially clamped between the head of each of the fasteners and the ring base.

18 Claims, 12 Drawing Sheets

(56) References Cited

U.S. PATENT DOCUMENTS

| | | | |
|---|---|---|---|
| 5,560,198 A | 10/1996 | Brewer | |
| 5,906,097 A | 5/1999 | Hebert | |
| 6,532,729 B2 | 3/2003 | Martens | |
| 7,305,817 B2 | 12/2007 | Blodgett | |
| 7,926,285 B2 | 4/2011 | Tisdale | |
| 8,356,468 B2 | 1/2013 | Cerra | |
| 10,364,748 B2 | 7/2019 | Teixeira | |
| 2009/0019857 A1 | 1/2009 | Tisdale | |
| 2010/0193605 A1 | 8/2010 | Johnson | |
| 2011/0043310 A1* | 2/2011 | Cardone | B25B 11/002 |
| | | | 335/289 |
| 2015/0360795 A1* | 12/2015 | Livingston | F16J 15/065 |
| | | | 277/647 |
| 2017/0129061 A1* | 5/2017 | Kloetzer | B23P 15/04 |
| 2017/0130672 A1 | 5/2017 | Ganz | |
| 2018/0066605 A1* | 3/2018 | Todorovic | F02K 1/80 |
| 2022/0195960 A1* | 6/2022 | Schrell | F02K 3/06 |
| 2022/0298990 A1 | 9/2022 | Chapelle | |
| 2023/0175458 A1 | 6/2023 | Strutt | |

OTHER PUBLICATIONS

EP Search Report for EP Patent Application No. 24199863.2 dated May 27, 2025.
EP Search Report for EP Patent Application No. 24199799.8 dated May 27, 2025.

* cited by examiner

EXHAUST NOZZLE ASSEMBLY FOR AIRCRAFT PROPULSION SYSTEM

This application claims priority to U.S. Provisional Patent Application No. 63/537,682 filed Sep. 11, 2023, which is hereby incorporated herein by reference in its entirety.

BACKGROUND

1. Technical Field

This disclosure relates generally to an aircraft propulsion system and, more particularly, to an exhaust nozzle assembly for the aircraft propulsion system.

2. Background Information

An aircraft propulsion system directs combustion products through an exhaust outlet between an exhaust nozzle and an exhaust center body. Sounds waves (e.g., noise) generated during propulsion system operation may be reduced using a chevron ring at the exhaust outlet. Various exhaust nozzle assemblies with chevron rings are known in the art. While these known exhaust nozzle assemblies have various benefits, there is still room in the art for improvement.

SUMMARY OF THE DISCLOSURE

According to an aspect of the present disclosure, an apparatus is provided for an aircraft propulsion system. This apparatus includes an exhaust nozzle, a first seal and a plurality of fasteners. The exhaust nozzle is configured as or otherwise includes a chevron ring. The chevron ring extends axially along an axis to and forms a downstream trailing edge of the exhaust nozzle. The chevron ring includes a ring base and a plurality of chevrons arranged circumferentially about the axis along the downstream trailing edge of the exhaust nozzle. The ring base includes a plurality of blind apertures arranged circumferentially about the axis. Each of the blind apertures projects radially inward towards the axis partially into the ring base. The fire seal is disposed radially outboard of the chevron ring. The fire seal axially and circumferentially overlaps the ring base. The fasteners mount the fire seal to the chevron ring. Each of the fasteners includes a shank and a head. The shank projects longitudinally out from the head, through the fire seal, and is threaded into a respective one of the blind apertures. The fire seal is radially clamped between the head of each of the fasteners and the ring base.

According to another aspect of the present disclosure, another apparatus is provided for an aircraft propulsion system. This apparatus includes an exhaust nozzle, a fire seal and a plurality of fasteners. The exhaust nozzle includes a nozzle wall and a nozzle ring. The nozzle wall extends axially along an axis from an upstream end of the nozzle wall to a downstream end of the nozzle wall. The nozzle wall extends circumferentially around the axis. An inner side of the nozzle wall forms an outer peripheral boundary of a propulsion system flowpath axially along the nozzle wall. The nozzle ring forms a downstream trailing edge of the exhaust nozzle. The nozzle ring projects axially out from the downstream end of the nozzle wall to the downstream trailing edge of the exhaust nozzle to form another outer peripheral boundary of the propulsion system flowpath axially along the nozzle ring. The nozzle ring includes a plurality of blind apertures arranged circumferentially about the axis. Each of the blind apertures projects radially inward towards the axis partially into the nozzle ring. The fire seal is disposed radially outboard of the nozzle ring. The fire seal axially and circumferentially overlaps the nozzle ring. The fasteners mount the fire seal to the nozzle ring. Each of the fasteners includes a shank and a head. The shank projects longitudinally out from the head, through the fire seal, and is threaded into a respective one of the blind apertures. The fire seal is radially clamped between the head of each of the fasteners and the nozzle ring.

According to still another aspect of the present disclosure, a manufacturing method for an aircraft propulsion system. This manufacturing method includes: arranging a fairing skin with a chevron ring, the fairing skin disposed radially outboard of the chevron ring, the chevron ring extending axially along an axis to and forming a downstream trailing edge of an exhaust nozzle, and the chevron ring including a ring base and a plurality of chevrons arranged circumferentially about the axis along the downstream trailing edge of the exhaust nozzle; attaching the fairing skin to the ring base with a plurality of rivets; arranging a fire seal with the chevron ring and the fairing skin; and attaching the fire seal to the chevron ring with a plurality of bolts, each of the bolts including a shank and a head, the shank projecting longitudinally out from the head, through the fire seal, and threaded into a respective blind aperture in the ring base, and the fire seal radially clamped between the head of each of the bolts and the ring base.

A first of the blind apertures may be formed by a threaded insert nested within a blind hole projecting radially inward towards the axis partially into the ring base.

The threaded insert may be configured as or otherwise include a helical coil.

The fire seal may include a seal base and a seal spring. The seal base may be mounted to the ring base by the fasteners. The seal spring may project axially out from the seal base, in an axial direction towards the downstream trailing edge of the exhaust nozzle, to a distal end of the fire seal. The seal spring may be radially spaced from the chevron ring by an air gap axially from the seal base to the distal end of the fire seal.

The fire seal may be formed by a stack of axially and circumferentially overlapping leaf spring seals.

The apparatus may also include an inner support member clamped radially between the seal base and the ring base. The shank may project longitudinally through the inner support member.

The apparatus may also include an outer support member. The seal base may be clamped radially between the outer support member and the inner support member. The shank may project longitudinally through the outer support member.

The apparatus may also include an outer support member. The seal base may be clamped radially between the outer support member and the ring base. The shank may project longitudinally through the outer support member.

The exhaust nozzle may also include a fairing skin disposed radially between the fire seal and the ring base. The shank may project longitudinally through the fairing skin. The fire seal and the fairing skin may be radially clamped between the head of each of the fasteners and the ring base.

The apparatus may also include a plurality of second fasteners mounting the fairing skin to the ring base independent of the fire seal.

The second fasteners may be configured as a plurality of rivets.

The fire seal may be disposed radially outboard of and may overlap an outer head of each of the second fasteners.

The exhaust nozzle may also include a nozzle wall extending axially along the axis from an upstream end of the nozzle wall to a downstream end of the nozzle wall. The nozzle wall may extend circumferentially around the axis. An inner side of the nozzle wall may form an outer peripheral boundary of a propulsion system flowpath axially along the nozzle wall to the ring base. The ring base may be attached to the nozzle wall at the downstream end of the nozzle wall. The fairing skin may axially and circumferentially overlap the ring base and the nozzle wall.

The fairing skin may be radially spaced from the nozzle wall by an air gap.

The exhaust nozzle may also include a nozzle wall extending axially along the axis from an upstream end of the nozzle wall to a downstream end of the nozzle wall. The nozzle wall may extend circumferentially around the axis. An inner side of the nozzle wall may form an outer peripheral boundary of a propulsion system flowpath axially along the nozzle wall to the ring base. The ring base may be attached to the nozzle wall at the downstream end of the nozzle wall.

The nozzle wall may include an inner skin, an outer skin and a cellular core radially between and bonded to the inner skin and the outer skin. The inner skin may form the inner side of the nozzle wall.

The apparatus may also include an exhaust center body and a flowpath exhaust. The exhaust nozzle may be spaced radially outboard from and circumscribe the exhaust center body. The flowpath exhaust may be formed by and extends radially between the exhaust center body and the chevron ring.

The apparatus may also include an engine core and a propulsion system flowpath. The engine core may include a compressor section, a combustor section and a turbine section. The propulsion system flowpath may extend sequentially through the compressor section, the combustor section and the turbine section to an exhaust. The exhaust nozzle may form a radial outer peripheral boundary of the exhaust.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
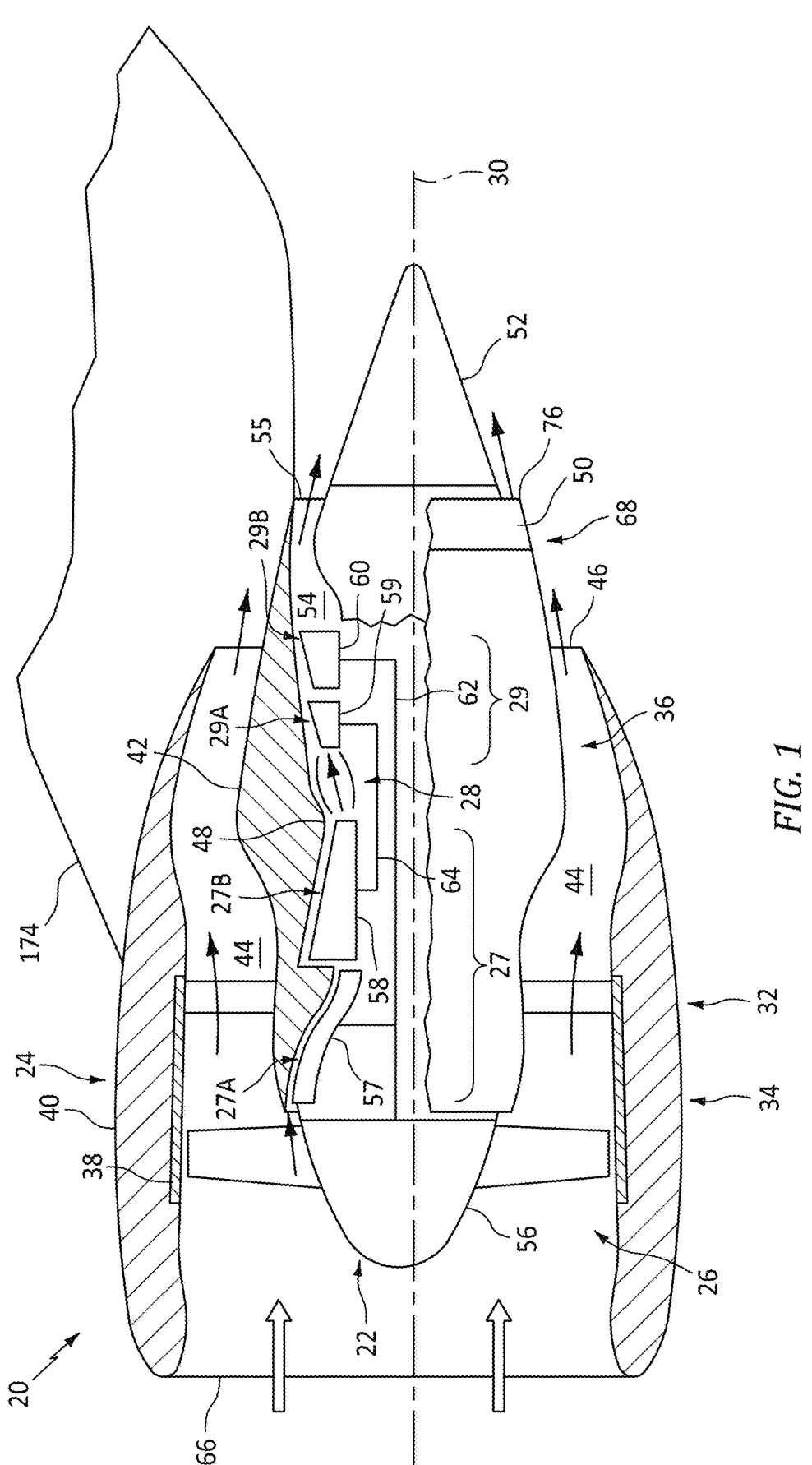
FIG. 1 is a side cutaway schematic illustration of an aircraft propulsion system.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 includes a gas turbine engine 22 and a nacelle 24.

The turbine engine 22 is configured to power operation of the aircraft propulsion system 20. For ease of description, the turbine engine 22 is generally described below as a turbofan engine such as a high-bypass turbofan engine. The turbine engine 22 of FIG. 1, for example, includes a fan section 26, a compressor section 27, a combustor section 28 and a turbine section 29. The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B. The present disclosure, however, is not limited to such an exemplary gas turbine engine nor to a gas turbine engine with a two-stage engine core.

The aircraft propulsion system 20 extends axially along an axis 30 from a forward, upstream end of the aircraft propulsion system 20 to an aft, downstream end of the aircraft propulsion system 20. The engine sections 26-29B of FIG. 1 are arranged sequentially along the axis 30 within a housing 32 of the aircraft propulsion system 20. Briefly, the axis 30 may be a centerline axis of the turbine engine 22, the propulsion system housing 32 and/or, more generally, the aircraft propulsion system 20. The axis 30 may also or alternatively be a centerline axis and/or a rotational axis of one or more rotating members of the turbine engine 22. The propulsion system housing 32 of FIG. 1 includes an outer housing structure 34 and an inner housing structure 36.

The outer housing structure 34 includes an outer case 38 (e.g., a fan case, a containment case, etc.) and an outer structure of the nacelle 24—an outer nacelle structure 40. The outer case 38 houses at least the fan section 26. The outer nacelle structure 40 houses and provides an aerodynamic cover over the outer case 38. The outer nacelle structure 40 also covers a portion of an inner structure of the nacelle 24—an inner nacelle structure 42. The outer nacelle structure 40 of FIG. 1, for example, axially overlaps and extends circumferentially about (e.g., completely around) the inner nacelle structure 42. The outer nacelle structure 40 and the inner nacelle structure 42 thereby at least partially or completely form a bypass flowpath 44; e.g., a D-duct, C-duct or O-duct bypass flowpath. This bypass flowpath 44 extends axially along the axis 30 within the aircraft propulsion system 20 to a bypass exhaust 46 (e.g., a bypass outlet orifice). The bypass flowpath 44 is formed by and extends radially between the outer nacelle structure 40 and the inner nacelle structure 42.

The inner housing structure 36 includes an inner case 48 (e.g., a core case) and the inner nacelle structure 42, which inner nacelle structure 42 may also be referred to as or include an inner fixed structure. The inner case 48 houses one or more of the engine sections 27A-29B, where at least (or only) the engine sections 27A-29B may collectively form a core of the turbine engine 22. The inner nacelle structure 42 houses and provides an aerodynamic cover for the inner case 48. A downstream/aft portion of the inner housing structure 36 such as, for example, a (e.g., tubular) core exhaust nozzle 50 of the inner nacelle structure 42 also covers at least a portion of an (e.g., conical) exhaust center body 52. More particularly, the inner nacelle structure 42 and its exhaust nozzle 50 axially overlap and extend circumferentially about (e.g., completely around) the exhaust center body 52. The exhaust nozzle 50 and the exhaust center body 52 thereby collectively form a downstream/aft portion of a core flowpath 54 (e.g., an annular core flowpath) within the turbine engine 22 and its engine core. This core flowpath 54 extends axially within the aircraft propulsion system 20, sequentially through the engine core and its engine sections 27A-29B, to a core exhaust 55 (e.g., an annular core outlet orifice) at and/or towards a downstream/aft end of the aircraft propulsion system 20.

Each of the engine sections 26-29B of FIG. 1 includes a respective bladed engine rotor 56-60. Each of these engine rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The engine shafts 62 and 64 are rotatably supported by a plurality of bearings (not shown). Each of these bearings is connected to the propulsion system housing 32 by at least one stationary structure such as, for example, an annular support strut.

During operation, air enters the aircraft propulsion system 20 through an airflow inlet 66 at the forward, upstream end of the aircraft propulsion system 20. This air is directed through the fan section 26 and into the core flowpath 54 and the bypass flowpath 44. The air entering the core flowpath 54 may be referred to as core air. The air within the bypass flowpath 44 may be referred to as bypass air.

The core air is compressed by the LPC rotor 57 and the HPC rotor 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially drive rotation of the HPT rotor 59 and the LPT rotor 60. The rotation of the HPT rotor 59 and the LPT rotor 60 respectively drive rotation of the HPC rotor 58 and the LPC rotor 57 and, thus, compression of the air received from an airflow inlet into the engine core. The rotation of the LPT rotor 60 also drives rotation of the fan rotor 56. This rotation of the fan rotor 56 propels bypass air through the bypass flowpath 44 and out of the aircraft propulsion system 20 through the bypass exhaust 46. The propulsion of the bypass air may account for a majority of thrust generated by the turbine engine 22.

Figure 2:
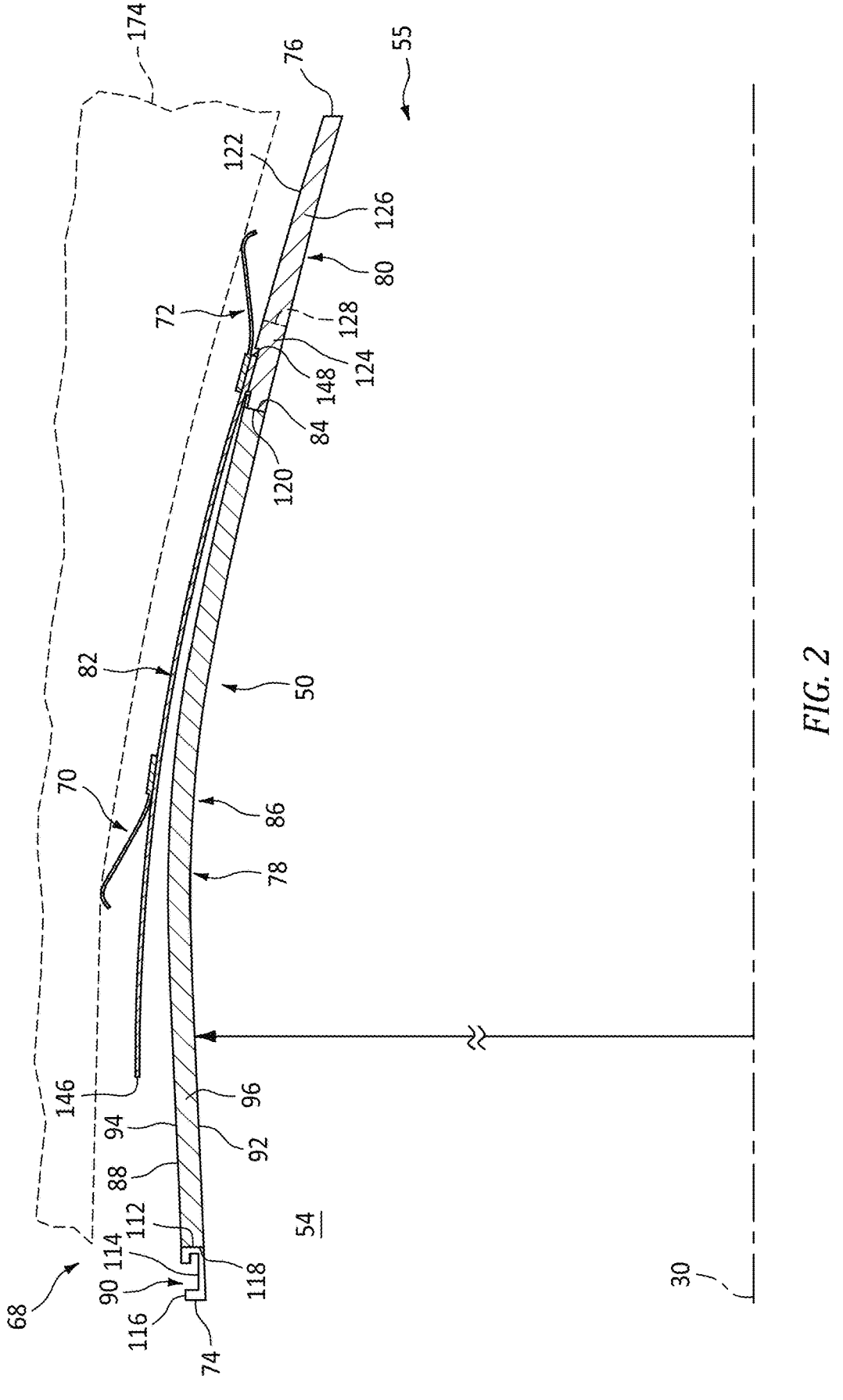
FIG. 2 is a partial side sectional illustration of an exhaust nozzle assembly.
Figure 3:
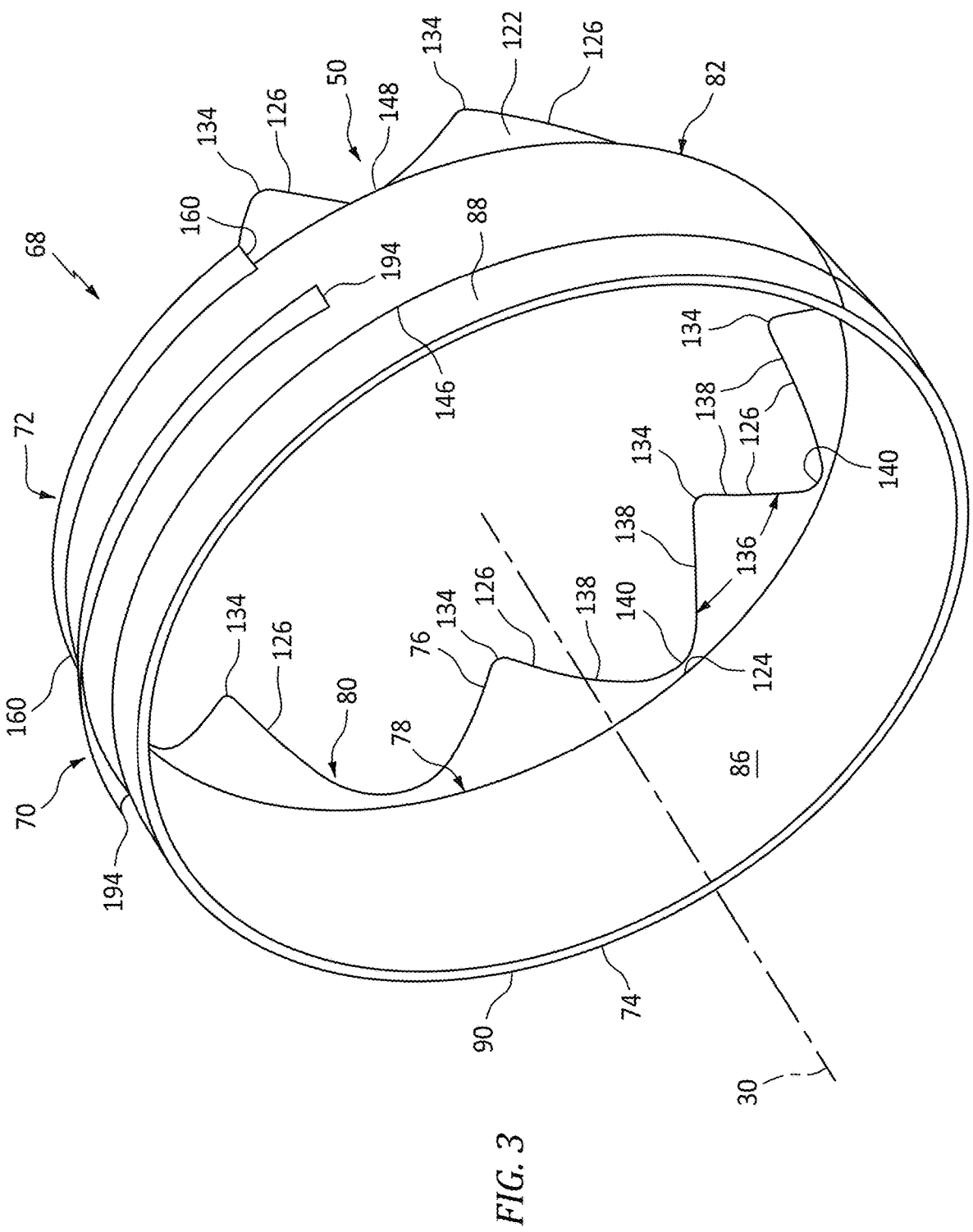
FIG. 3 is a perspective illustration of the exhaust nozzle assembly.

FIG. 2 illustrates an exhaust nozzle assembly 68 for the aircraft propulsion system 20. This exhaust nozzle assembly 68 includes the exhaust nozzle 50 and one or more fire seals;

e.g., an axial forward, upstream fire seal 70 and an axial aft, downstream fire seal 72. The exhaust nozzle 50 extends axially along the axis 30 from an axial forward, upstream end 74 of the exhaust nozzle 50 to an axial aft, downstream trailing edge 76 of the exhaust nozzle 50. The exhaust nozzle 50 of FIG. 2 includes an exhaust nozzle wall 78, an exhaust nozzle ring 80 and an exhaust nozzle fairing skin 82. Referring to FIG. 3, the exhaust nozzle 50 and each of its members 78, 80 and 82 extend circumferentially about (e.g., completely around) the axis 30. The exhaust nozzle 50 and its members 78, 80 and 82 may thereby each have a full-hoop (e.g., tubular and/or annular) geometry around the axis 30.

Figure 5:
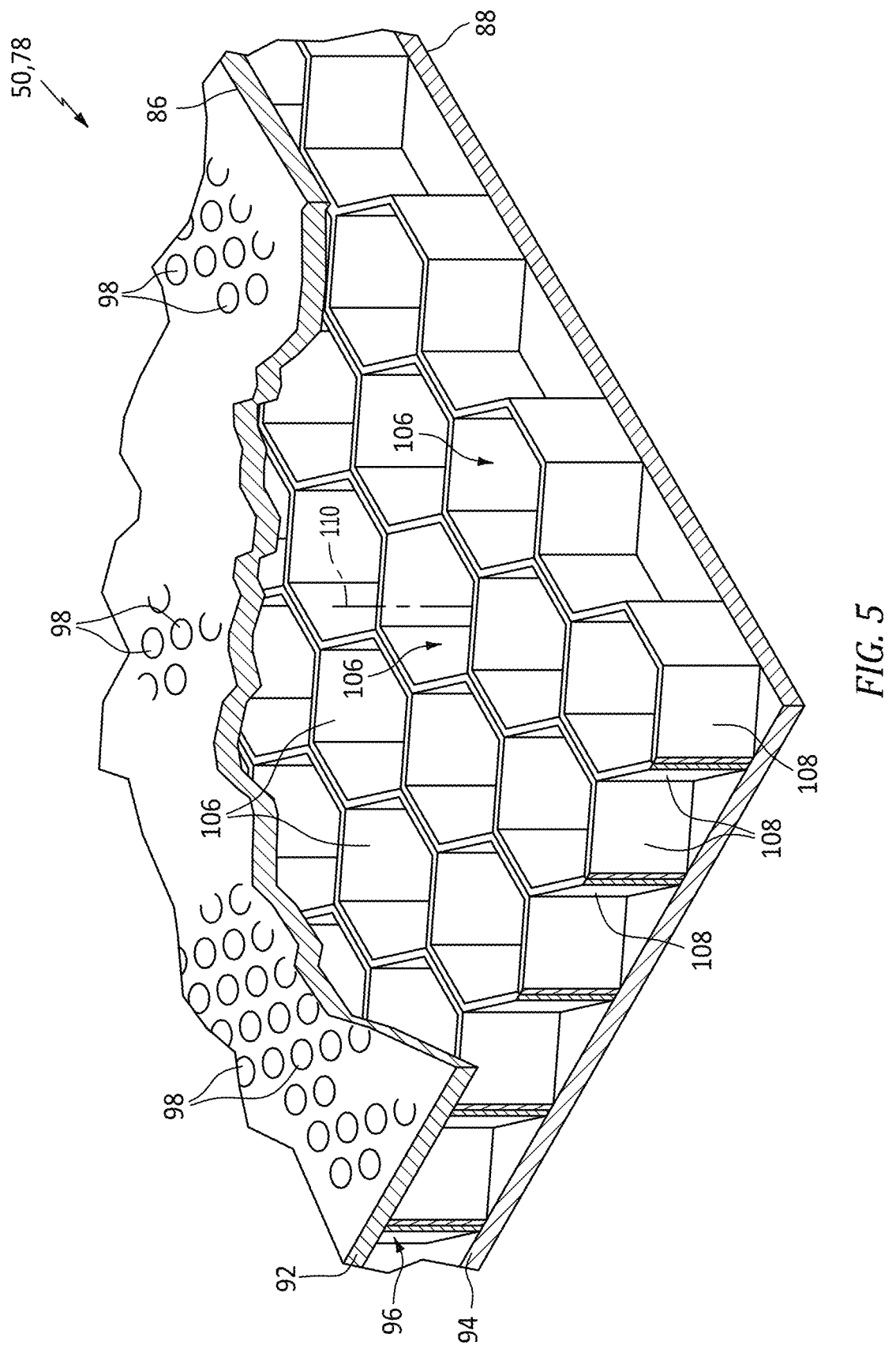
FIG. 5 is a partial perspective cutaway illustration of the nozzle wall.
Figure 6:
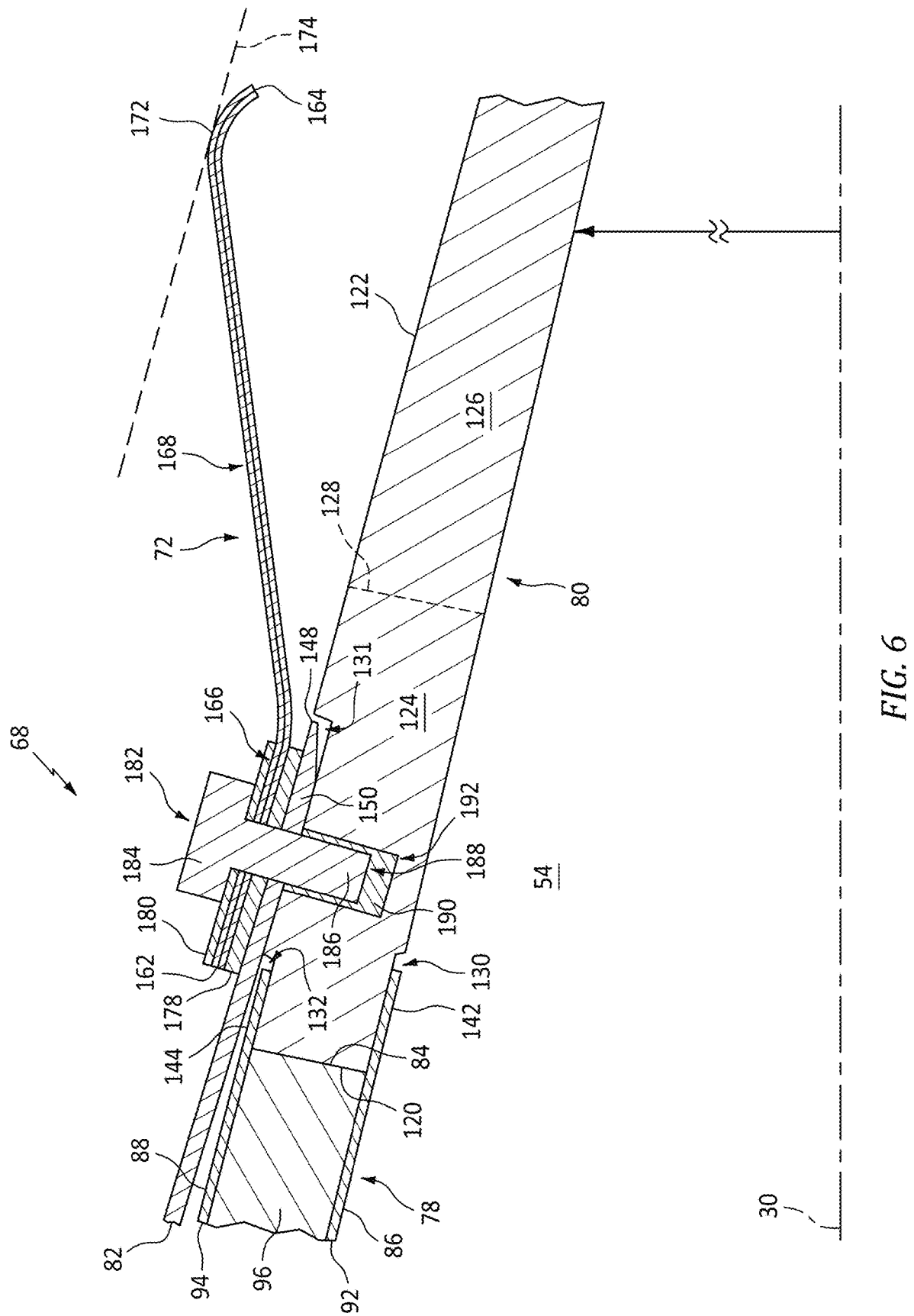
FIG. 6 is a partial side sectional illustration of the exhaust nozzle assembly at a downstream fire seal.

Referring to FIG. 2, the nozzle wall 78 extends axially along the axis 30 from the nozzle upstream end 74 to an axial aft, downstream end 84 of the nozzle wall 78; see also FIG. 6. Here, the nozzle upstream end 74 of FIG. 2 is also an axial forward, upstream end of the nozzle wall 78. The nozzle wall 78 extends radially from a radial inner side 86 of the exhaust nozzle 50 and its nozzle wall 78 to a radial outer side 88 of the nozzle wall 78. The nozzle wall 78 of FIG. 2 includes a structured panel (e.g., an acoustic panel) and an exhaust nozzle mounting structure 90. The structured panel of FIG. 2 includes a fluid permeable (e.g., perforated) radial inner skin 92, a fluid impermeable (e.g., non-perforated) radial outer skin 94 and a cellular core 96; see also FIGS. 4 and 5.

Figure 4:
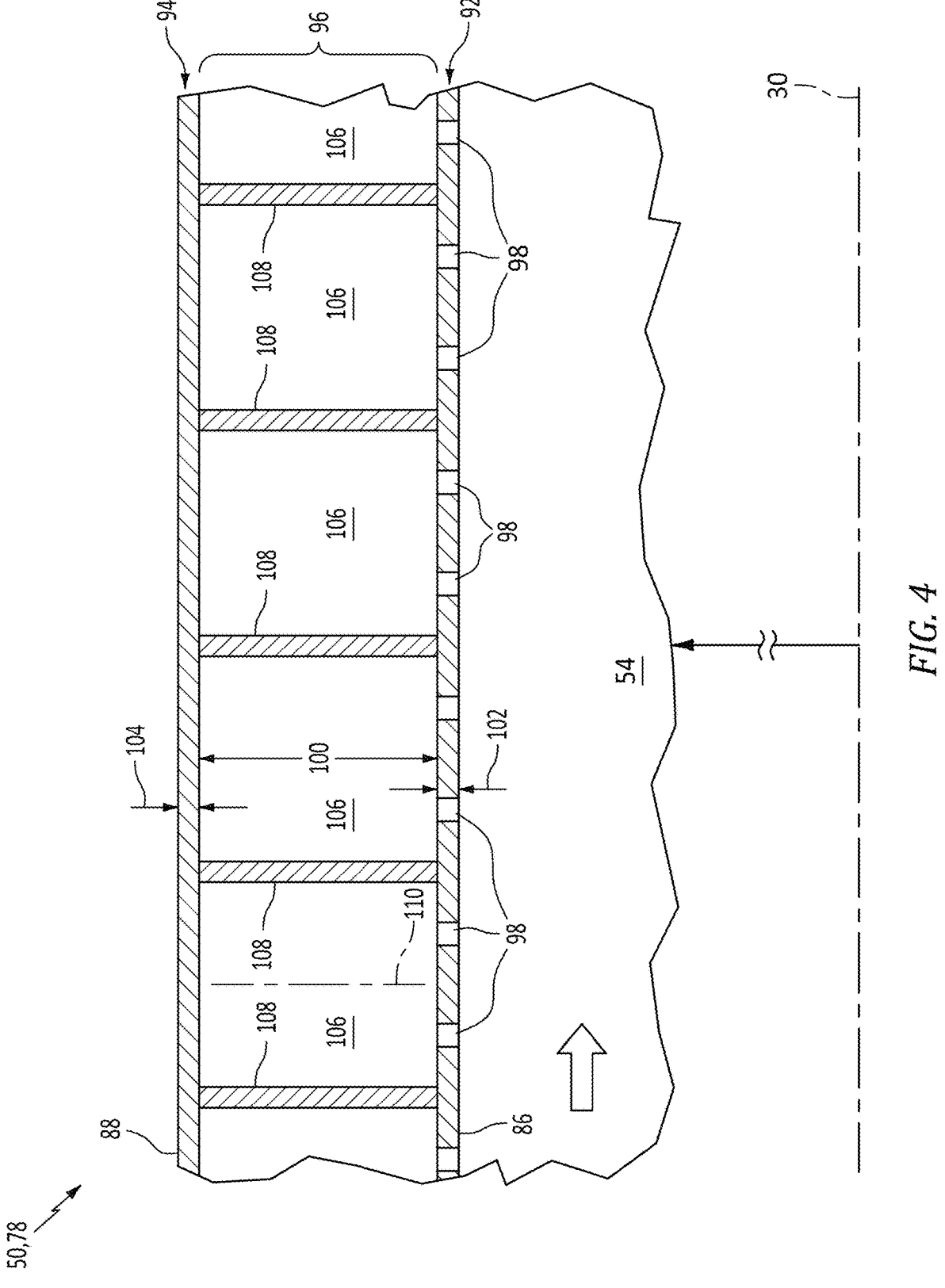
FIG. 4 is a partial side sectional illustration of a nozzle wall.

The nozzle inner skin 92 may be constructed from a relatively thin sheet or layer of material; e.g., sheet metal. The nozzle inner skin 92 extends axially along the axis 30 from the nozzle upstream end 74 to (or about) the wall downstream end 84. In the particular arrangement of FIG. 2, the nozzle inner skin 92 projects axially (e.g., slightly) past the wall downstream end 84 to axially overlap the nozzle ring 80 as described below in further detail. The nozzle inner skin 92 extends circumferentially about (e.g., completely around) the axis 30. The nozzle inner skin 92 may thereby form an axial forward, upstream section of the nozzle inner side 86 from the nozzle upstream end 74 to the nozzle ring 80. This nozzle inner skin 92 and its inner side upstream section also form a radial outer peripheral boundary of the core flowpath 54 axially along the exhaust nozzle 50 and its nozzle wall 78 from the nozzle upstream end 74 to the nozzle ring 80. Referring to FIG. 4, the nozzle inner skin 92 includes a plurality of inner skin perforations 98; e.g., apertures such as through-holes. Each of these inner skin perforations 98 extends (e.g., radially) through the nozzle inner skin 92 thereby piercing the nozzle inner side 86 along the core flowpath 54.

Referring to FIG. 2, the nozzle outer skin 94 may be constructed from a relatively thin sheet or layer of material; e.g., sheet metal. The nozzle outer skin 94 of FIG. 2 extends axially along the axis 30 from about the nozzle upstream end 74 to (or about) the wall downstream end 84. In the particular arrangement of FIG. 2, the nozzle outer skin 94 projects axially (e.g., slightly) past the wall downstream end 84 to axially overlap the nozzle ring 80 as described below in further detail. The nozzle outer skin 94 extends circumferentially about (e.g., completely around) the axis 30. The nozzle outer skin 94 thereby axially overlaps and extends circumferentially about (e.g., circumscribes) the nozzle inner skin 92. The nozzle outer skin 94 of FIG. 4 is configured as a continuous, uninterrupted and/or non-perforated skin; e.g., a skin without any perforations at least along internal cavities of the nozzle wall 78.

Referring to FIG. 4, the nozzle core 96 is disposed radially between the nozzle inner skin 92 and the nozzle outer skin 94. The nozzle core 96 of FIG. 4, for example, has a radial thickness 100 that extends radially from the nozzle inner skin 92 to the nozzle outer skin 94. A radial inner side of the nozzle core 96 may be radially abutted against or otherwise engage the nozzle inner skin 92. A radial outer side of the nozzle core 96 is radially abutted against or otherwise engage the nozzle outer skin 94. The nozzle core 96 of FIG. 4 is also bonded (e.g., diffusion bonded) to and/or otherwise attached to the nozzle inner skin 92 and the nozzle outer skin 94. Referring to FIG. 2, the nozzle core 96 extends axially along the axis 30 from the nozzle mounting structure 90 to the nozzle ring 80. The nozzle core 96 extends circumferentially about (e.g., completely around) the axis 30.

The core thickness 100 of FIG. 4 may be substantially larger than a radial thickness 102 of the nozzle inner skin 92 and/or a radial thickness 104 of the nozzle outer skin 94. The core thickness 100, for example, may be at least two to ten times (2-10x), or more, larger than the inner skin thickness 102 and/or the outer skin thickness 104. The nozzle wall 78 of the present disclosure, however, is not limited to such an exemplary dimensional relationship and the core thickness 100 may vary based on sound attenuation requirements, space requirements, etc.

The nozzle core 96 is configured to form one or more internal core cavities 106 (e.g., open internal chambers, acoustic resonance chambers, etc.) within the nozzle wall 78 and radially between the nozzle inner skin 92 and the nozzle outer skin 94. Referring to FIG. 5, the nozzle core 96 may be configured as a honeycomb core. The nozzle core 96 of FIG. 5, for example, includes a plurality of corrugated sidewalls 108. These corrugated sidewalls 108 are arranged in a side-by-side array and are connected to one another such that each neighboring (e.g., adjacent) pair of the corrugated sidewalls 108 forms an array of the core cavities 106 laterally (e.g., circumferentially and/or axially) therebetween. The nozzle core 96 and its corrugated sidewalls 108 may be constructed from or otherwise include a core material such as metal; e.g., sheet metal.

Each core cavity 106 of FIG. 4 extends radially within/through the nozzle core 96 from the nozzle inner skin 92 to the nozzle outer skin 94. One or more or all of the core cavities 106 may thereby each overlap and be fluidly coupled with a respective set of one or more of the inner skin perforations 98. Referring to FIG. 5, each of the core cavities 106 has a cross-sectional geometry (e.g., shape, size, etc.) when viewed in a reference plane; e.g., a plane perpendicular to a centerline 110 of the respective core cavity 106. This cavity cross-sectional geometry may have a polygonal shape such as a hexagonal shape. However, various other types of cellular cores including various other types of honeycomb cores are known in the art, and the present disclosure is not limited to any particular ones thereof.

Referring to FIG. 2, the nozzle mounting structure 90 is configured to support the exhaust nozzle 50 at the nozzle upstream end 74. The nozzle mounting structure 90 is also configured to mount the exhaust nozzle 50 and its members to a component of the inner housing structure 36 (see FIG. 1) such as a turbine exhaust case (TEC). The nozzle mounting structure 90 extends axially along the axis 30 in an axial forward, upstream direction (e.g., axially away from nozzle trailing edge 76) from the nozzle core 96 to the nozzle upstream end 74. The nozzle mounting structure 90 of FIG. 2 includes a forward, upstream closeout ring 112, an extension arm 114 and an attach flange 116. The nozzle mounting structure 90 and each of its members 112, 114 and 116 extend circumferentially about (e.g., completely around) the axis 30.

The closeout ring 112 is axially abutted against an axial forward, upstream end 118 of the nozzle core 96. The closeout ring 112 is disposed and extends radially between the nozzle inner skin 92 and the nozzle outer skin 94. The closeout ring 112 is also bonded (e.g., diffusion bonded) or otherwise attached to the nozzle inner skin 92 and the nozzle outer skin 94. The extension arm 114 projects axially along the nozzle inner skin 92 out from the closeout ring 112 to the attach flange 116. The extension arm 114 is also bonded (e.g., diffusion bonded) or otherwise attached to the nozzle inner skin 92. The attach flange 116 is disposed at the nozzle upstream end 74 and projects radially outward, away from the nozzle inner skin 92 and the extension arm 114, to a radial outer distal end of the attach flange 116. The attach flange 116 is also bonded (e.g., diffusion bonded) or otherwise attached to the nozzle inner skin 92. The nozzle mounting structure 90 is thereby formed as an integrated part of the nozzle wall 78 along with the nozzle core 96. Here, the nozzle mounting structure 90 and its members 112, 114 and 116 axially and circumferentially overlap the nozzle inner skin 92. The nozzle outer skin 94 axially and circumferentially overlaps the nozzle mounting structure 90 and its closeout ring 112. The present disclosure, however, is not limited to such an exemplary integration of the nozzle mounting structure 90 into the nozzle wall 78.

The nozzle ring 80 is configured to form the nozzle trailing edge 76. The nozzle ring 80 of FIG. 2, for example, extends axially along the axis 30 out form an axial forward, upstream end 120 of the nozzle ring 80 to the nozzle trailing edge 76. Here, the nozzle trailing edge 76 of FIG. 2 is also an axial aft, downstream trailing edge of the nozzle ring 80. The nozzle ring 80 extends radially from the radial inner side 86 of the exhaust nozzle 50 and its nozzle ring 80 to a radial outer side 122 of the exhaust nozzle 50 and its nozzle ring 80. The nozzle ring 80 may thereby form (a) an axial aft, downstream section of the nozzle inner side 86 from the nozzle wall 78 to the nozzle trailing edge 76 and (b) an axial aft, downstream section of the nozzle outer side 122 from the nozzle wall 78 to the nozzle trailing edge 76. The nozzle ring 80 and its inner side downstream section also form another radial outer peripheral boundary of the core flowpath 54 axially along the exhaust nozzle 50 and its nozzle ring 80 from the nozzle wall 78 to the nozzle trailing edge 76. The nozzle ring 80 may be configured as an exhaust nozzle chevron ring. The nozzle ring 80 of FIG. 3, for example, includes a nozzle ring base 124 and one or more chevrons 126.

Referring to FIG. 2, the ring base 124 is disposed at the ring upstream end 120. The ring base 124 of FIG. 2, for example, extends axially along the axis 30 from the ring upstream end 120 to an axial aft, downstream end 128 of the ring base 124. The ring base 124 extends radially between and to the nozzle inner side 86 and the nozzle outer side 122. The ring base 124 extends circumferentially about (e.g., completely around) the axis 30; e.g., see also FIG. 3.

Referring to FIG. 6, the ring base 124 may include one or more recesses 130-132 at the ring upstream end 120. The inner skin recess 130 projects partially radially outward into the ring base 124 from the nozzle inner side 86 to an inner skin land. The fairing skin recess 131 projects partially radially inward into the ring base 124 from the nozzle outer side 122 to a fairing skin land. The outer skin recess 132 projects partially radially inward into the ring base 124 from the fairing skin land to an outer skin land. Each of the recesses 130-132 projects axially in an axial aft, downstream direction (e.g., axially towards the nozzle trailing edge 76) partially into the ring base 124 to an axial end of the respective recess 130-132. Each of these recesses 130-132 may extend within the ring base 124 circumferentially about (e.g., completely around) the axis 30. Each of the recesses 130-132 may thereby have an annular geometry around the axis 30.

Referring to FIG. 3, the chevrons 126 are arranged and may (or may not) be equispaced circumferentially about the axis 30 in an annular or an arcuate array along the nozzle trailing edge 76. Each of these chevrons 126 is connected to the ring base 124 at its base downstream end 128 (see FIG. 2). Each of the chevrons 126 projects axially out from the ring base 124 to a tip 134 of the respective chevron 126 at the nozzle trailing edge 76. Each of these chevrons 126 may have a substantially triangular or otherwise tapered geometry when viewed, for example, in a reference plane tangent to the nozzle ring 80 at the respective chevron 126. Each of the chevrons 126 of FIG. 3, for example, has a width 136 that extends lateral (e.g., circumferential) between opposing lateral sides 138 of the respective chevron 126. This chevron width 136 decreases as the respective chevron 126 extends axially from (or about) the ring base 124 to the respective chevron tip 134, where the chevron sides 138 laterally converge and meet at the chevron tip 134. At the ring base 124, each circumferentially neighboring (e.g., adjacent) pair of the chevrons 126 and their respective circumferential circumferentially neighboring chevron sides 138 may meet and form an inter-chevron trough 140. Here, at least (or only) the chevron tips 134, the chevron sides 138 and the inter-chevron troughs 140 may collectively form the nozzle trailing edge 76. The nozzle trailing edge 76 of FIG. 3 thereby has an axially undulating (e.g., wavy, sinusoidal, sawtooth, etc.) geometry around the axis 30.

The nozzle ring 80 of FIGS. 2 and 3 is formed as a monolithic body; e.g., a metal body. The ring base 124 and the chevrons 126, for example, may be cast, forged, milled, machined, additively manufactured and/or otherwise formed as a single, unitary body. By contrast, a non-monolithic body includes a plurality of members which are discretely formed and subsequently attached together. The present disclosure, however, is not limited to the foregoing exemplary nozzle ring formation techniques.

Referring to FIG. 6, the nozzle ring 80 may be integrated with the nozzle wall 78 at or about the wall downstream end 84. The ring base 124 of FIG. 6, for example, is axially abutted against and/or otherwise engaged with the nozzle core 96. The nozzle inner skin 92 projects axially in the axial downstream direction away from the nozzle core 96 and into the inner skin recess 130. An axial aft, downstream end portion 142 of the nozzle inner skin 92 is disposed (e.g., seated) in the inner skin recess 130 radially against the inner skin land. The inner skin end portion 142 thereby extends axially and circumferentially along the nozzle ring 80 and its ring base 124. This inner skin end portion 142 is also bonded (e.g., diffusion bonded) to the nozzle ring 80 and its ring base 124. Similarly, the nozzle outer skin 94 projects axially in the axial downstream direction away from the nozzle core 96 and into the outer skin recess 132. An axial aft, downstream end portion 144 of the nozzle outer skin 94 is disposed (e.g., seated) in the outer skin recess 132 radially against the outer skin land. The outer skin end portion 144 thereby extends axially and circumferentially along the nozzle ring 80 and its ring base 124. This outer skin end portion 144 is also bonded (e.g., diffusion bonded) to the nozzle ring 80 and its ring base 124. Here, the nozzle ring 80 and its ring base 124 are disposed radially between the nozzle inner skin 92 and the nozzle outer skin 94. With the foregoing arrangement, the nozzle ring 80 may be connected to the nozzle wall 78 without use of any fasteners; e.g., bolts, rivets, etc. The nozzle ring 80 and its ring base 124 may also form an axial aft, downstream closeout for the nozzle wall 78.

To facilitate attachment of the nozzle ring 80 with the nozzle wall 78, the nozzle ring 80 may be bonded to the nozzle inner skin 92 and the nozzle outer skin 94 concurrently with the nozzle core 96. For example, the nozzle ring 80 and its ring base 124 may be tack welded (e.g., resistance tack welded) to the nozzle core 96. This tack welded structure may then be arranged with the nozzle inner skin 92 and the nozzle outer skin 94 to facilitate (e.g., concurrent) bonding of the nozzle inner skin 92 and the nozzle outer skin 94 to the nozzle core 96 and the ring base 124. The nozzle core 96 may also be diffusion bonded to the nozzle ring 80 and its ring base 124 as well.

Figure 7:
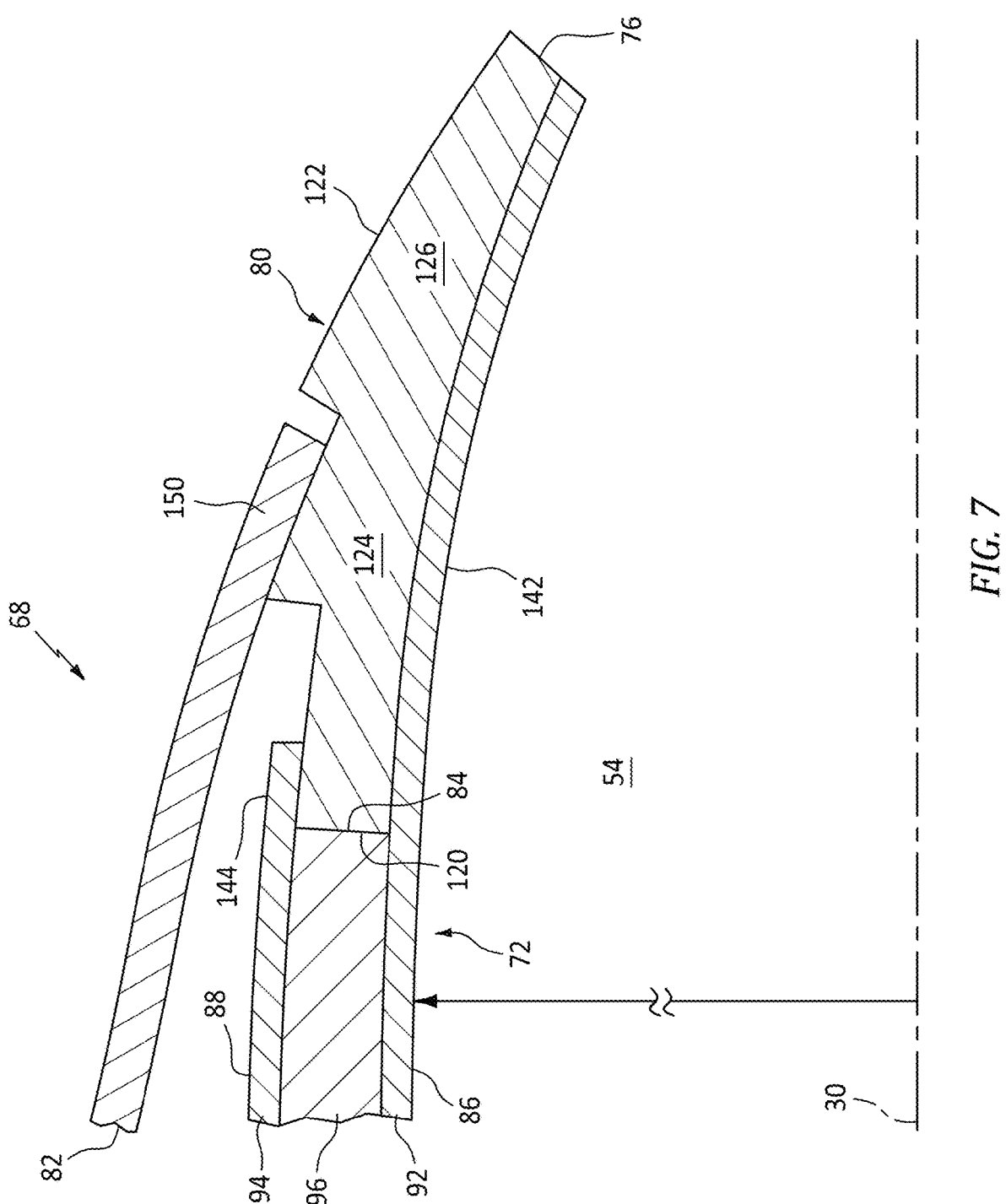
FIG. 7 is a partial side sectional illustration of another exhaust nozzle assembly.

As described above, the nozzle inner skin 92 and the nozzle outer skin 94 may each partially axially overlap the nozzle ring 80 and its ring base 124. It is contemplated, however, that the nozzle inner skin 92 and/or the nozzle outer skin 94 may alternatively completely axially overlap the nozzle ring 80. The nozzle inner skin 92 of FIG. 7, for example, may extend along an axial extent of the nozzle ring 80 to the nozzle trailing edge 76. With such an arrangement, the exhaust nozzle 50 may be configured with fewer interruptions along its nozzle inner side 86.

Referring to FIG. 2, the nozzle fairing skin 82 extends axially along the axis 30 from an axial forward, upstream end 146 of the nozzle fairing skin 82 to an axial aft, downstream end 148 of the nozzle fairing skin 82. The nozzle fairing skin 82 extends radially from a radial inner side of the nozzle fairing skin 82 to the radial outer side 122 of the exhaust nozzle 50 and its nozzle fairing skin 82. The nozzle fairing skin 82 may thereby form an axial forward, upstream section of the nozzle outer side 122 from the fairing skin upstream end 146 to the nozzle ring 80. The nozzle fairing skin 82 may be constructed from a relatively thin sheet or layer of material; e.g., sheet metal.

Figure 8:
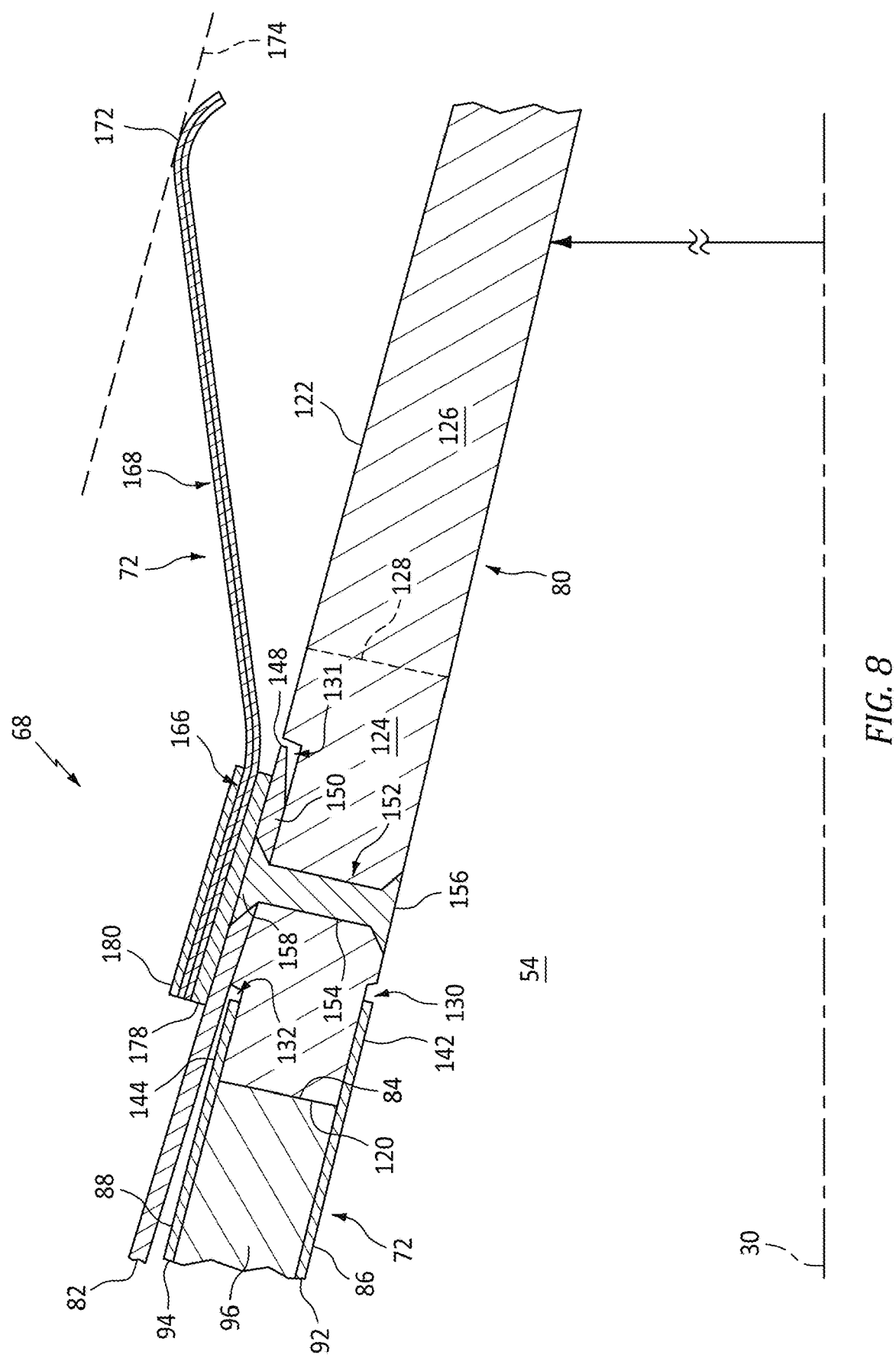
FIG. 8 is a partial side sectional illustration of the exhaust nozzle assembly at the downstream fire seal at another circumferential position.

The nozzle fairing skin 82 is disposed radially outboard of the nozzle wall 78 and the nozzle ring 80. Referring to FIG. 8, the nozzle fairing skin 82 is attached to the nozzle ring 80 and its ring base 124 at the fairing skin downstream end 148. The nozzle fairing skin 82 of FIG. 8, for example, projects axially in the axial downstream direction into the fairing skin recess 131. An axial aft, downstream end portion 150 of the nozzle fairing skin 82 is disposed (e.g., seated) in the fairing skin recess 131 radially against the fairing skin land. The fairing skin end portion 150 may (or may not) also lay radially against the outer skin end portion 144. The fairing skin end portion 150 thereby extends axially and circumferentially along the nozzle ring 80 and its ring base 124 as well as optionally the outer skin end portion 144.

This nozzle fairing skin 82 may be mechanically fastened to the nozzle ring 80, for example independent of the downstream fire seal 72. The nozzle fairing skin 82 and its fairing skin end portion 150 of FIG. 8, for example, are mechanically attached to the nozzle ring 80 and its ring base 124 by a plurality of fairing skin-nozzle ring fasteners 152 (one visible in FIG. 8). These fairing skin-nozzle ring fasteners 152 are arranged and may (or may not) be equispaced circumferentially about the axis 30. Each of the fairing skin-nozzle ring fasteners 152 may be configured as a rivet; e.g., a double flush solid rivet. A shank 154 of each of the fairing skin-nozzle ring fasteners 152 extends radially between an inner head 156 of the respective fairing skin-nozzle ring fastener 152 and an outer head 158 of the respective fairing skin-nozzle ring fastener 152. The fastener inner head 156 may be recessed into the nozzle ring 80 and the nozzle inner side 86. The fastener outer head 158 may be recessed into the nozzle fairing skin 82 at the nozzle outer side 122. The downstream fire seal 72 may thereby be disposed radially outboard of the fairing skin-nozzle ring fasteners 152 as described below in further detail.

While the nozzle fairing skin 82 of FIG. 8 radially engages the nozzle ring 80 and its ring base 124, the nozzle fairing skin 82 of FIG. 2 is radially spaced from the nozzle wall 78. For example, as the nozzle fairing skin 82 projects axially in the axial upstream direction away from (or about) the fairing skin end portion 150 (see FIGS. 6 and 8)/the fairing skin downstream end 148 and to (or about) the fairing skin upstream end 146, the nozzle fairing skin 82 may radially diverge away from the nozzle wall 78. The nozzle fairing skin 82 may thereby be substantially or completely radially spaced from the nozzle wall 78 and its nozzle outer skin 94 by an air gap.

Figures 9, 10:
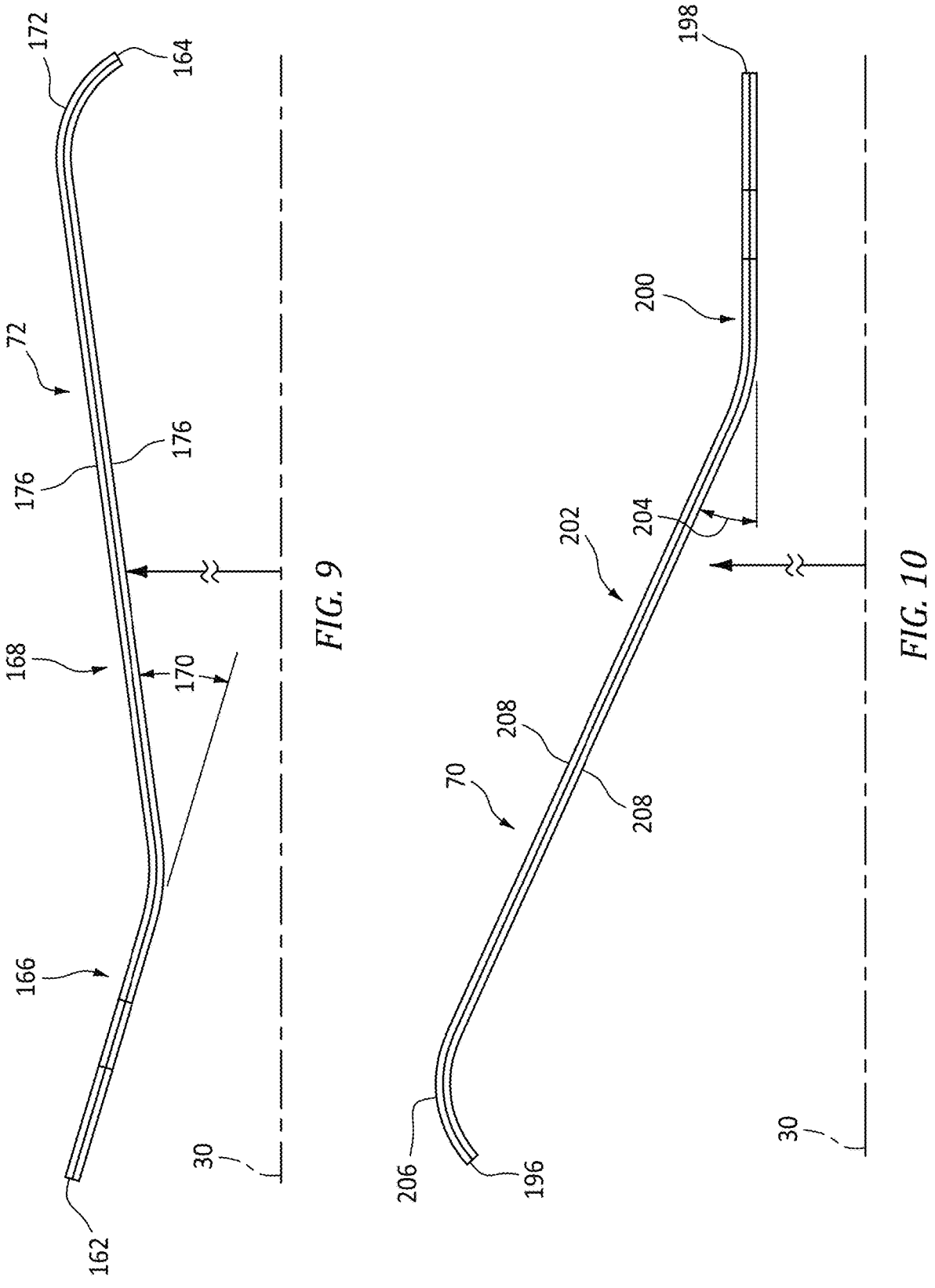
FIG. 9 is a partial side sectional illustration of the downstream fire seal.
FIG. 10 is a partial side sectional illustration of an upstream fire seal.

Referring to FIG. 3, the downstream fire seal 72 extends circumferentially about the axis 30 between circumferentially opposing ends 160 of the downstream fire seal 72. Referring to FIG. 9, the downstream fire seal 72 extends axially along the axis 30 from an axial forward, upstream end 162 of the downstream fire seal 72 to an axial aft, downstream end 164 of the downstream fire seal 72. The downstream fire seal 72 of FIG. 9 includes a downstream seal base 166 and a downstream seal spring 168 (e.g., a cantilevered spring seal element). The downstream seal spring 168 projects axially out from the downstream seal base 166 in the axial downstream direction to an axial unsupported distal end of the downstream seal spring 168; here, the downstream seal downstream end 164. The downstream seal spring 168 is angularly offset from the downstream seal base 166, at least at an interface between the downstream fire seal members 166 and 168, by an offset angle 170. This downstream seal offset angle 170 may be a non-zero acute offset angle between, for example, ten degrees (10°) and seventy degrees (70°) inclusive; e.g., between twenty-five degrees (25°) and thirty-five degrees (35°) inclusive. At the distal end of the downstream fire seal 72, the downstream seal spring 168 may turn radially inward to provide the downstream fire seal 72 with a land 172 for interfacing with a pylon structure 174 for the aircraft propulsion system 20; e.g., see FIG. 6.

The downstream fire seal 72 of FIG. 9 may be formed by a stack of axially and circumferentially overlapping (e.g., parallel) leaf spring seals 176. Each of these leaf spring seals 176 may be constructed from a formed relatively thin sheet of resilient material; e.g., metal. The present disclosure, however, is not limited to such an exemplary downstream fire seal configuration.

Referring to FIG. 6, the downstream fire seal 72 is disposed radially outboard of the nozzle ring 80 and the nozzle fairing skin 82. In the arrangement of FIG. 6, an arcuate downstream inner support member 178 (e.g., a radial spacer and/or a radial gasket element) is disposed radially between and abutted against or otherwise engaged with the fairing skin end portion 150 and the downstream seal base 166. An arcuate downstream outer support member 180 (e.g., a radial clamping member) is disposed radially outboard of and abutted against or otherwise engaged with the downstream seal base 166. Here, the downstream seal base 166 is clamped radially between the downstream inner support member 178 and the downstream outer support member 180.

The downstream fire seal 72 of FIG. 6 as well as the downstream inner support member 178 and the downstream outer support member 180 are mechanically attached to the nozzle ring 80 and its ring base 124 by a plurality of downstream seal-nozzle ring fasteners 182; e.g., bolts. These downstream seal-nozzle ring fasteners 182 are arranged and may (or may not) be equispaced circumferentially about the axis 30 and along the downstream fire seal 72. Each of the downstream seal-nozzle ring fasteners 182 includes a downstream fastener head 184 and a downstream fastener shank 186. The downstream fastener head 184 is radially abutted against or otherwise engaged with the downstream outer support member 180. The downstream fastener shank 186 projects longitudinally (e.g., generally radially inward) out from the downstream fastener head 184, sequentially through apertures (e.g., through-holes) in the respective members 180, 72, 178 and 82, and is threaded into a respective threaded blind aperture 188 in the nozzle ring 80 and its ring base 124. This blind aperture 188 projects partially longitudinally (e.g., generally radially inward) into the ring base 124 towards the axis 30 to a distal bottom end of the blind aperture 188. The blind aperture 188 may be formed by a threaded insert 190 (e.g., a helical coil, etc.) nested within a (e.g., unthreaded) blind hole 192 projecting longitudinally into the ring base 124 towards the axis 30. With this arrangement, the respective members 180, 72, 178 and 82 are radially sandwiched and clamped between each downstream fastener head 184 and the nozzle ring 80 and its ring base 124. Moreover, by mounting the downstream fire seal 72 to the nozzle ring 80 with the downstream seal-nozzle ring fasteners 182 rather than the fairing skin-nozzle ring fasteners 152 of FIG. 8, the downstream fire seal 72 may be disassembled and removed/replaced without also removing the nozzle fairing skin 82.

Referring to FIG. 3, the upstream fire seal 70 extends circumferentially about the axis 30 between circumferentially opposing ends 194 of the upstream fire seal 70. Referring to FIG. 10, the upstream fire seal 70 extends axially along the axis 30 from an axial forward, upstream end 196 of the upstream fire seal 70 to an axial aft, downstream end 198 of the upstream fire seal 70. The upstream fire seal 70 of FIG. 10 includes an upstream seal base 200 and an upstream seal spring 202 (e.g., a cantilevered spring seal element). The upstream seal spring 202 projects axially out from the upstream seal base 200 in the axial upstream direction to an axial unsupported distal end of the upstream seal spring 202; here, the upstream seal upstream end 196. The upstream seal spring 202 is angularly offset from the upstream seal base 200, at least at an interface between the upstream fire seal members 200 and 202, by an offset angle 204. This upstream seal offset angle 204 may be a non-zero acute offset angle between, for example, ten degrees (10°) and seventy degrees (70°) inclusive; e.g., between twenty-five degrees (25°) and thirty-five degrees (35°) inclusive. At the distal end of the upstream fire seal 70, the upstream seal spring 202 may turn radially inward to provide the upstream fire seal 70 with a land 206 for interfacing with the pylon structure 174 for the aircraft propulsion system 20; e.g., see FIG. 11.

The upstream fire seal 70 of FIG. 10 may be formed by a stack of axially and circumferentially overlapping (e.g., parallel) leaf spring seals 208. Each of these leaf spring seals 208 may be constructed from a formed relatively thin sheet of resilient material; e.g., metal. The present disclosure, however, is not limited to such an exemplary upstream fire seal configuration.

Figure 11:
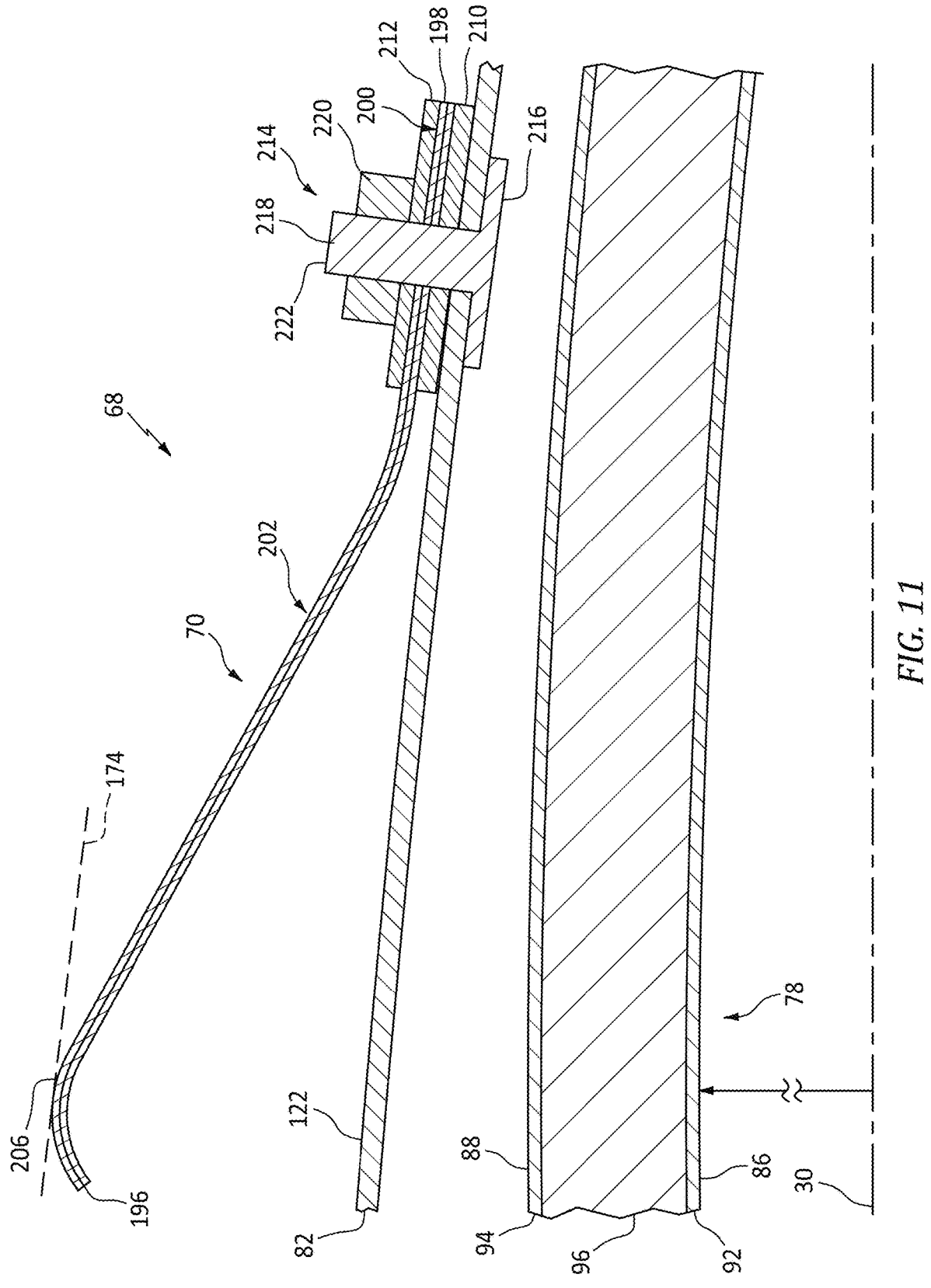
FIG. 11 is a partial side sectional illustration of the exhaust nozzle assembly at the upstream fire seal.

Referring to FIG. 11, the upstream fire seal 70 is disposed radially outboard of the nozzle fairing skin 82 at, for example, an axial intermediate location between the fairing skin upstream end 146 and the downstream fire seal 72 (see FIG. 2). In the arrangement of FIG. 11, an arcuate upstream inner support member 210 (e.g., a radial spacer and/or a radial gasket element) is disposed radially between and abutted against or otherwise engaged with the fairing skin and the upstream seal base 200. An arcuate upstream outer support member 212 (e.g., a radial clamping member) is disposed radially outboard of and abutted against or otherwise engaged with the upstream seal base 200. Here, the upstream seal base 200 is clamped radially between the upstream inner support member 210 and the upstream outer support member 212.

The upstream fire seal 70 of FIG. 11 as well as the upstream inner support member 210 and the upstream outer support member 212 are mechanically attached to the nozzle fairing skin 82 by a plurality of upstream seal-fairing skin fastener assemblies 214. These upstream seal-fairing skin fastener assemblies 214 are arranged and may (or may not) be equispaced circumferentially about the axis 30 and along the downstream fire seal 72. Each of the upstream seal-fairing skin fastener assemblies 214 includes a stud plate 216, a threaded stud 218 and a nut 220. The stud plate 216 is disposed radially inboard of the nozzle fairing skin 82, and is radially spaced out from the nozzle wall 78. The stud plate 216 is radially abutted against or otherwise engages the nozzle fairing skin 82, and the stud plate 216 may be mounted to the nozzle fairing skin 82. The threaded stud 218 projects longitudinally (e.g., generally radially outwards) out from the respective stud plate 216, sequentially through apertures (e.g., through-holes) in the respective members 82, 210, 70 and 212, and to a distal stud end 222 of the threaded stud 218. The nut 220 is threaded onto the respective threaded stud 218 at its distal stud end 222. The nut 220 is disposed radially outboard of and is radially abutted against or otherwise engages the nozzle fairing skin 82. With this arrangement, the respective members 82, 210, 70 and 212 are radially sandwiched and clamped between each stud plate 216 and the respective nut 220. Moreover, by arranging the stud plate 216 radially inboard of the nozzle fairing skin 82 and the nut 220 radially outboard of the nozzle fairing skin 82, an axial height of the respective upstream seal-fairing skin fastener assembly 214 inward of the nozzle fairing skin 82 may be minimized.

Figures 12, 13:
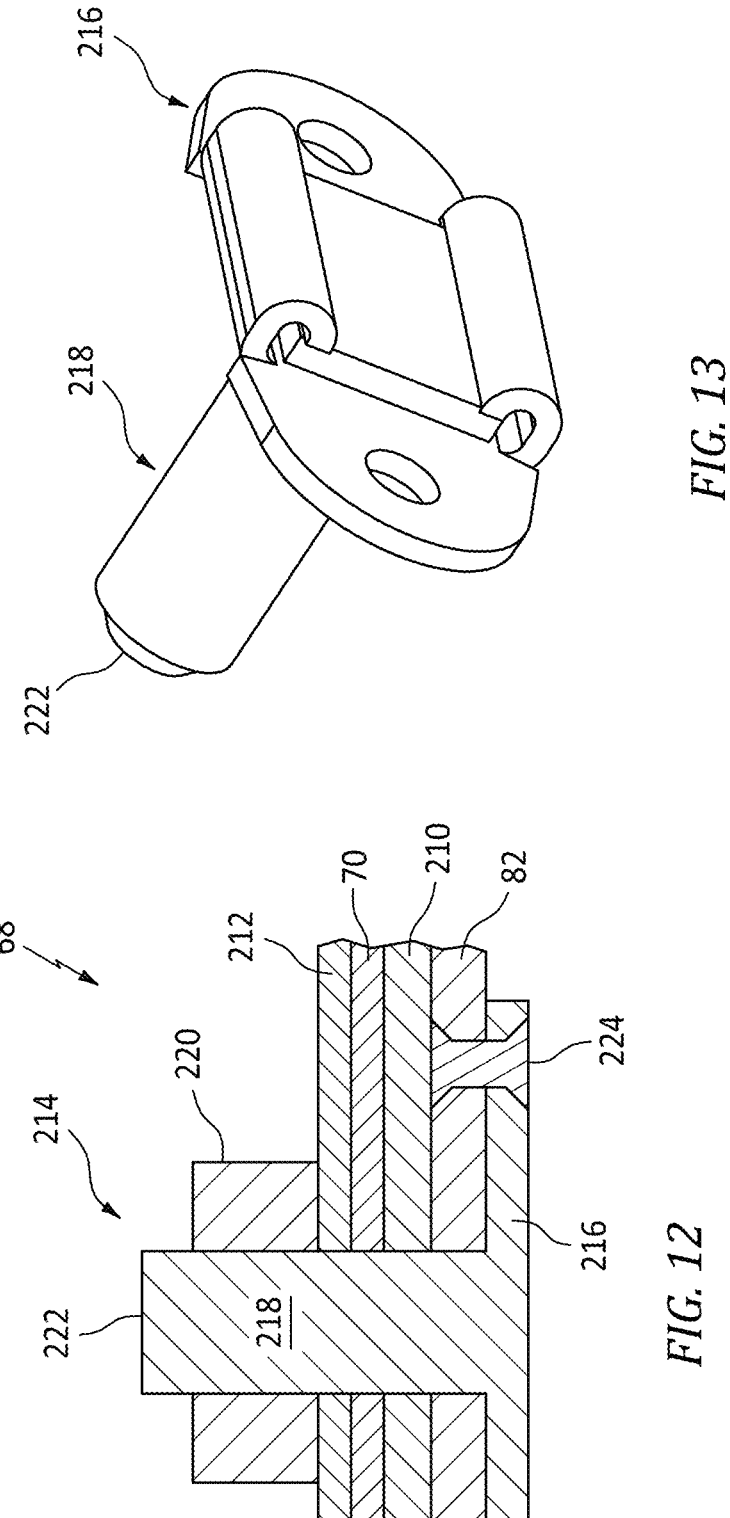
FIG. 12 is a partial cross-sectional illustration of the exhaust nozzle assembly at the upstream fire seal.
FIG. 13 is a perspective illustration of a threaded stud attached to a stud plate.

Referring to FIG. 12, each stud plate 216 may be mounted to the nozzle fairing skin 82 by one or more fasteners 224. Examples of these fasteners 224 include, but are not limited to, rivets.

In some embodiments, referring to FIG. 12, each threaded stud 218 may be formed integral with or otherwise bonded to the respective stud plate 216. In other embodiments, referring to FIG. 13, a head of each threaded stud 218 may be clamped to the respective stud plate 216.

Figure 14:
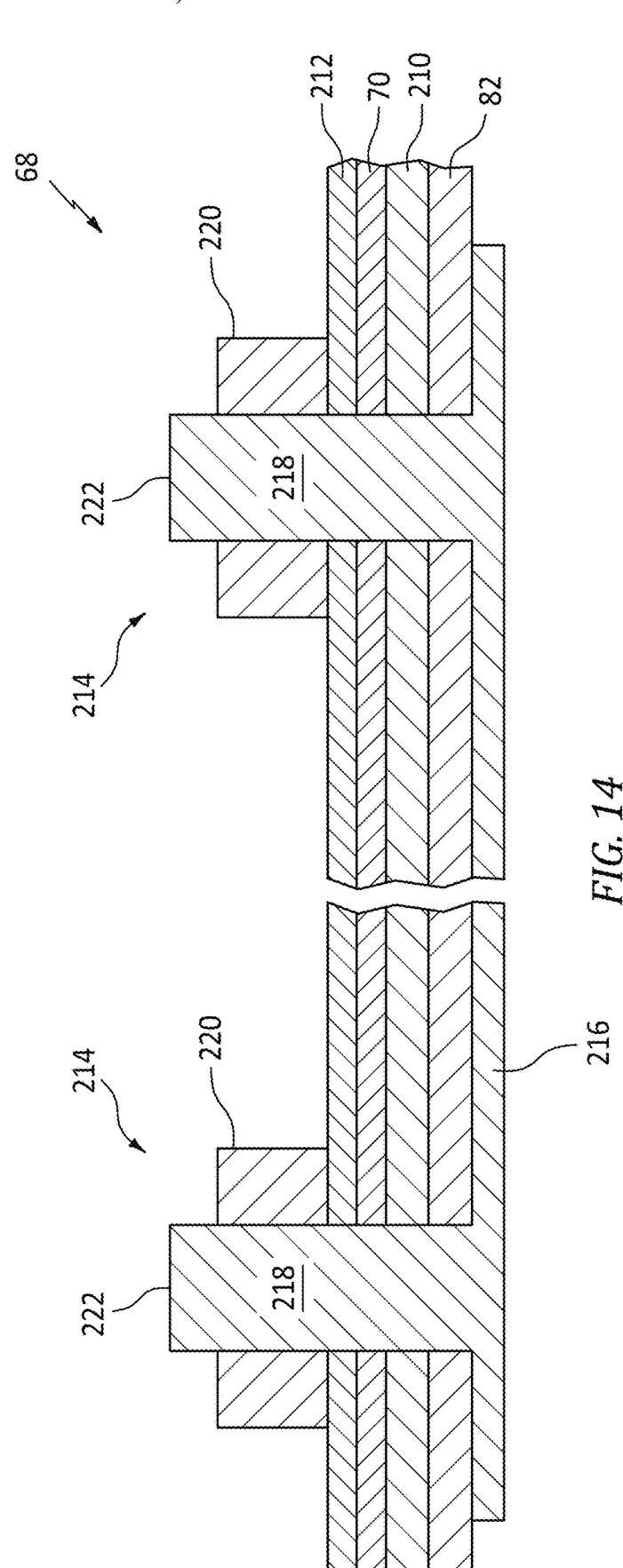
FIG. 14 is a partial cross-sectional illustration of the exhaust nozzle assembly at the upstream fire seal with another stud plate arrangement.

In some embodiments, referring to FIG. 12 (see also FIG. 13), each stud plate 216 may be associated with a single respective one of the threaded studs 218. In other embodiments, referring to FIG. 14, each stud plate 216 may be associated with multiple of the threaded studs 218.

The exhaust nozzle 50 may be included in various gas turbine engines other than the one described above. The exhaust nozzle 50, for example, may be included in a geared gas turbine engine where a gear train connects one or more shafts to one or more rotors in a fan section, a compressor section and/or any other engine section. Alternatively, the exhaust nozzle 50 may be included in a direct drive gas turbine engine configured without a gear train. The exhaust nozzle 50 may be included in a gas turbine engine configured with a single spool, with two spools (e.g., see FIG. 1), or with more than two spools. The gas turbine engine may be configured as a turbofan engine, a turbojet engine, a propfan engine, a pusher fan engine or any other type of gas turbine engine with an exhaust nozzle. The present disclosure therefore is not limited to any particular types or configurations of gas turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:

an exhaust nozzle comprising a chevron ring, the chevron ring extending axially along an axis to and forming a downstream trailing edge of the exhaust nozzle, the chevron ring including a ring base and a plurality of chevrons arranged circumferentially about the axis along the downstream trailing edge of the exhaust nozzle, the ring base comprising a plurality of blind apertures arranged circumferentially about the axis, and each of the plurality of blind apertures projecting radially inward towards the axis partially into the ring base;

a fire seal disposed radially outboard of the chevron ring, the fire seal axially and circumferentially overlapping the ring base; and a plurality of fasteners mounting the fire seal to the chevron ring, each of the plurality of fasteners including a shank and a head, the shank projecting longitudinally out from the head, through the fire seal, and threaded into a respective one of the blind apertures, and the fire seal radially clamped between the head of each of the plurality of fasteners and the ring base;

wherein the fire seal includes a seal base mounted to the ring base by the plurality of fasteners; and a seal spring projecting axially out from the seal base, in an axial direction towards the downstream trailing edge of the exhaust nozzle, to a distal end of the fire seal, and the seal spring radially spaced from the chevron ring by an air gap axially from the seal base to the distal end of the fire seal.

2. The apparatus of claim 1, wherein a first of the blind apertures is formed by a threaded insert nested within a blind hole projecting radially inward towards the axis partially into the ring base.

3. The apparatus of claim 2, wherein the threaded insert comprises a helical coil.

4. The apparatus of claim 1, wherein the fire seal is formed by a stack of axially and circumferentially overlapping leaf spring seals.

5. The apparatus of claim 1, further comprising an inner support member clamped radially between the seal base and the ring base, the shank projecting longitudinally through the inner support member.

6. The apparatus of claim 5, further comprising an outer support member, the seal base clamped radially between the outer support member and the inner support member, and the shank projecting longitudinally through the outer support member.

7. The apparatus of claim 1, further comprising an outer support member, the seal base clamped radially between the outer support member and the ring base, and the shank projecting longitudinally through the outer support member.

8. The apparatus of claim 1, wherein the exhaust nozzle further comprises a nozzle wall extending axially along the axis from an upstream end of the nozzle wall to a downstream end of the nozzle wall;

the nozzle wall extending circumferentially around the axis;

an inner side of the nozzle wall forming an outer peripheral boundary of a propulsion system flowpath axially along the nozzle wall to the ring base; and the ring base attached to the nozzle wall at the downstream end of the nozzle wall.

9. The apparatus of claim 8, wherein the nozzle wall includes an inner skin, an outer skin and a cellular core radially between and bonded to the inner skin and the outer skin; and the inner skin forms the inner side of the nozzle wall.

10. The apparatus of claim 1, further comprising:

an exhaust center body, the exhaust nozzle spaced radially outboard from and circumscribing the exhaust center body; and a flowpath exhaust formed by and extending radially between the exhaust center body and the chevron ring.

11. The apparatus of claim 1, further comprising:

an engine core including a compressor section, a combustor section and a turbine section;

a propulsion system flowpath extending sequentially through the compressor section, the combustor section and the turbine section to an exhaust; and the exhaust nozzle forming a radial outer peripheral boundary of the exhaust.

12. An apparatus for an aircraft propulsion system, comprising:

an exhaust nozzle comprising a nozzle wall and a nozzle ring, the nozzle wall extending axially along an axis from an upstream end of the nozzle wall to a downstream end of the nozzle wall, the nozzle wall extending circumferentially around the axis, an inner side of the nozzle wall forming an outer peripheral boundary of a propulsion system flowpath axially along the nozzle wall, the nozzle ring forming a downstream trailing edge of the exhaust nozzle, the nozzle ring projecting axially out from the downstream end of the nozzle wall to the downstream trailing edge of the exhaust nozzle to form another outer peripheral boundary of the propulsion system flowpath axially along the nozzle ring, the nozzle ring comprising a plurality of blind apertures arranged circumferentially about the axis, and each of the plurality of blind apertures projecting radially inward towards the axis partially into the nozzle ring;

a fire seal disposed radially outboard of the nozzle ring, the fire seal axially and circumferentially overlapping the nozzle ring; and a plurality of fasteners mounting the fire seal to the nozzle ring, each of the plurality of fasteners including a shank and a head, the shank projecting longitudinally out from the head, through the fire seal, and threaded into a respective one of the blind apertures, and the fire seal radially clamped between the head of each of the plurality of fasteners and the nozzle ring.

13. An apparatus for an aircraft propulsion system, comprising:

an exhaust nozzle comprising a chevron ring, the chevron ring extending axially along an axis to and forming a downstream trailing edge of the exhaust nozzle, the chevron ring including a ring base and a plurality of chevrons arranged circumferentially about the axis along the downstream trailing edge of the exhaust nozzle, the ring base comprising a plurality of blind apertures arranged circumferentially about the axis, and each of the plurality of blind apertures projecting radially inward towards the axis partially into the ring base;

a fire seal disposed radially outboard of the chevron ring, the fire seal axially and circumferentially overlapping the ring base; and a plurality of fasteners mounting the fire seal to the chevron ring, each of the plurality of fasteners including a shank and a head, the shank projecting longitudinally out from the head, through the fire seal, and threaded into a respective one of the blind apertures, and the fire seal radially clamped between the head of each of the plurality of fasteners and the ring base;

wherein the exhaust nozzle further comprises a fairing skin disposed radially between the fire seal and the ring base;

the shank projecting longitudinally through the fairing skin; and the fire seal and the fairing skin radially clamped between the head of each of the plurality of fasteners and the ring base.

14. The apparatus of claim 13, further comprising a plurality of second fasteners mounting the fairing skin to the ring base independent of the fire seal.

15. The apparatus of claim 14, wherein the plurality of second fasteners comprises a plurality of rivets.

16. The apparatus of claim 14, wherein the fire seal is disposed radially outboard of and overlaps an outer head of each of the plurality of second fasteners.

17. The apparatus of claim 13, wherein the exhaust nozzle further comprises a nozzle wall extending axially along the axis from an upstream end of the nozzle wall to a downstream end of the nozzle wall;

the nozzle wall extending circumferentially around the axis;

an inner side of the nozzle wall forming an outer peripheral boundary of a propulsion system flowpath axially along the nozzle wall to the ring base;

the ring base attached to the nozzle wall at the downstream end of the nozzle wall; and the fairing skin axially and circumferentially overlapping the ring base and the nozzle wall.

18. The apparatus of claim 17, wherein the fairing skin is radially spaced from the nozzle wall by an air gap.

* * * * *